United States Patent
Vitsnudel et al.

(10) Patent No.: US 8,068,697 B2
(45) Date of Patent: Nov. 29, 2011

(54) REAL TIME VIDEO STABILIZER

(75) Inventors: Ilia Vitsnudel, Even Yeuda (IL); Eduard Oks, Bat-Yam (IL)

(73) Assignee: Broadcom Corporation, Irvine, CA (US)

( * ) Notice: Subject to any disclaimer, the term of this patent is extended or adjusted under 35 U.S.C. 154(b) by 1076 days.

(21) Appl. No.: 11/874,527

(22) Filed: Oct. 18, 2007

(65) Prior Publication Data

US 2008/0095459 A1 Apr. 24, 2008

Related U.S. Application Data

(60) Provisional application No. 60/852,677, filed on Oct. 19, 2006.

(51) Int. Cl.
G06K 9/32 (2006.01)
H04N 5/228 (2006.01)

(52) U.S. Cl. .............. 382/294; 382/260; 348/208.99; 348/208.4

(58) Field of Classification Search .......... 382/151, 382/260, 294; 348/308, E5.091
See application file for complete search history.

(56) References Cited

U.S. PATENT DOCUMENTS

| | | | | |
|---|---|---|---|---|
| 3,905,045 | A * | 9/1975 | Nickel | 382/130 |
| 5,960,125 | A * | 9/1999 | Michael et al. | 382/294 |
| 6,594,403 | B1 * | 7/2003 | Bozdagi et al. | 382/284 |
| 7,379,575 | B2 * | 5/2008 | Ruhrnschopf | 382/128 |
| 7,837,624 | B1 * | 11/2010 | Hossack et al. | 600/443 |
| 2001/0033702 | A1 * | 10/2001 | Kawabata | 382/294 |
| 2002/0002679 | A1 * | 1/2002 | Murakami et al. | 713/176 |
| 2005/0018927 | A1 * | 1/2005 | Manabe | 382/294 |
| 2005/0249431 | A1 * | 11/2005 | Ruhmschopf | 382/274 |
| 2005/0285947 | A1 * | 12/2005 | Grindstaff et al. | 348/208.4 |
| 2006/0061661 | A1 * | 3/2006 | Grindstaff et al. | 348/208.99 |
| 2006/0110042 | A1 * | 5/2006 | Onishi et al. | 382/199 |
| 2006/0153447 | A1 * | 7/2006 | Ouchi | 382/173 |
| 2006/0193535 | A1 * | 8/2006 | Mishima et al. | 382/294 |
| 2006/0204136 | A1 * | 9/2006 | Lee | 382/294 |
| 2006/0262210 | A1 * | 11/2006 | Smith et al. | 348/308 |
| 2007/0003165 | A1 * | 1/2007 | Sibiryakov et al. | 382/294 |
| 2007/0023689 | A1 * | 2/2007 | Iizuka et al. | 250/491.1 |
| 2007/0071316 | A1 * | 3/2007 | Kubo | 382/162 |
| 2007/0177035 | A1 * | 8/2007 | Hatano et al. | 348/231.99 |
| 2007/0273653 | A1 * | 11/2007 | Chen et al. | 345/166 |
| 2008/0095459 | A1 * | 4/2008 | Vitsnudel et al. | 382/260 |
| 2009/0154821 | A1 * | 6/2009 | Sorek et al. | 382/250 |
| 2009/0262208 | A1 * | 10/2009 | Vitsnudel | 348/222.1 |
| 2010/0157070 | A1 * | 6/2010 | Mohanty et al. | 348/208.1 |

FOREIGN PATENT DOCUMENTS

EP 2073531 A1 * 6/2009

* cited by examiner

*Primary Examiner* — Jason M Repko
*Assistant Examiner* — Gandhi Thirugnanam
(74) *Attorney, Agent, or Firm* — McAndrews, Held & Malloy, Ltd.

(57) ABSTRACT

A method of correcting a current image taken by a capturing device, the current image captured after a previous image, the method comprising the steps of: determining a noticeable pixel group, such as an edge of an object in the previous image; locating the noticeable pixel groups in the current image, by finding corresponding pixels whose values are most similar to the values of the noticeable pixels, determining the offset between the previous image and the current image, and correcting the current image using the offset. Optionally, multiple offsets are determined for multiple areas in the current image, and other areas in the image are optionally corrected according to interpolations between the determined offsets.

24 Claims, 5 Drawing Sheets

REAL TIME VIDEO STABILIZER

CROSS-REFERENCE TO RELATED APPLICATIONS/INCORPORATION BY REFERENCE

The present application claims priority to and claims benefit from U.S. Application No. 60/852,677, filed on Oct. 19, 2006. The above-identified application is hereby incorporated herein by reference in its entirety.

BACKGROUND OF THE INVENTION

1. Field of the Invention

The present invention relates to image processing in general, and to a method and apparatus for stabilizing images in video in particular.

2. Discussion of the Related Art

Digital cameras, especially digital video cameras, may move while capturing an image. Movement of cameras may include voluntary as well as non-voluntary movements. Non-voluntary movements may be caused by non-voluntary movements of the person holding the camera, by movement of a tripod on which the camera is mounted, or by other factors, such as wind. As a result of the movements, when the camera moves, objects in images may be distorted, dislocated or otherwise incorrectly imaged. Another result is blurred images, in which the details are hardly recognizable. Yet another result is objects in the scene appearing both in the correct location and in misplaced location determined by motion compensation, or objects appearing distorted.

Two popular types of sensors for capturing images are used in digital cameras. One is CCD sensor that enables capturing the entire image simultaneously, and the other is CMOS sensor in which the image is captured in parts. For example, the image may be captured row-wise or column-wise, wherein the rows or columns are captured sequentially. Thus, when using CMOS sensors, if the camera moves while capturing the image, objects or parts thereof may be dislocated. Consequently, one row may require more compensation than a previously captured row. In addition to movement of the camera, movement of objects during exposure of a portion of the image also requires motion compensation when using CMOS sensors.

Referring to FIGS. 1A, 1B and 1C, schematically illustrating three images taken by a moving camera. FIG. 1A was captured using a CCD sensor, while FIGS. 1B and 1C were captured using a CMOS sensor. All three images show a tree perpendicular to the ground. The lower portion of the images comprises two lines, one is the base line (104 in FIG. 1A) and the other is the trunk (102 in FIG. 1A). The upper portion comprises the treetop of the tree (106 in FIG. 1A). On FIG. 1A, camera movement causes movement of all parts of the tree, since the entire image is captured simultaneously. Line 104 is perpendicular to line 102, but the entire tree appears at the left side of the image.

The image in FIG. 1B was captured using CMOS sensor while the camera was moving slowly. Hence, objects are located more on the right-hand side of the image, instead of being located in the center of the image. Rows in the image are captured at different times. For example, if the scanning direction is top-to-bottom, i.e. a top row is scanned before a bottom row, and then lower parts of the image in FIG. 1B are captured after the upper parts. The slow movement causes the lower parts of the image to be slightly moved to the right hand side of the image. Further, the difference between the times each row is captured causes the lower portion of line 104 to be more shifted to the right than the upper portion of line 104. As a result, base line 112 is not perpendicular to trunk 114 in FIG. 1B.

In FIG. 1C, fast movement of the camera causes significant differences in the location of objects in the image. The motion compensation required in FIG. 1C is more significant than the compensation required in FIG. 1B, since the difference between the correct locations of objects and the captured locations is larger than the differences between FIG. 1B and FIG. 1A. For example, base line 122 in FIG. 1C is located on the extremity of the right portion, while base line 112 in FIG. 1B is located in the middle right portion. Further, treetop 126 of the tree shown in FIG. 1C is distorted relatively to treetop 116 and treetop 126 in FIGS. 1A and 1B respectively, since the fast camera movement also causes significant change in the location of the upper objects in FIG. 1C.

One solution for video stabilization is to change the location or angle of an optical element, such as a lens or the camera sensor. The element is preferably displaced in the opposite direction to the camera movement direction. This solution is hardware based and requires a two-step method: first detecting the movement in terms of speed and direction and then calibrating the optical elements accordingly. The solution is relatively inaccurate and requires expensive and sensitive hardware elements.

Another solution for image stabilization is to compare a current image with to previously captured images.

The difference between a current image moved by a predetermined offset, and a previous image is determined for multiple offsets. The offset for which the difference is minimal is the preferred offset between the images and is used for correcting the image. The offset values are stored in a correlation matrix, in which the rows represent vertical offset, the columns represent horizontal offset, and the value within each entry in the matrix is the difference. The solution enables motion compensation but requires sufficient memory for storing images in their entirety. In video cameras, as in all digital cameras, memory is an expensive resource and it is desirable to provide a solution for image stabilization that provides real time motion compensation without requiring additional memory. Further, comparing images in their entirety requires significant processing power and consumes time that may disable real time stabilization of video or image.

There is thus a need for image stabilization techniques, which can produce real time results, while imposing low memory requirements.

SUMMARY OF THE DISCLOSURE

The current disclosure teaches a method and apparatus for stabilizing a current frame. The frame is to be corrected from errors resulting form involuntary movements, stretching, shrinking, shearing or other effects. The disclosure suggests storing only limited information about one or more previous frames or previous corrections, comparing them to pixels in the current frame, determining the required correction, and applying the correction to the current frame.

a first aspect of the disclosure relates to a method of correcting a current image taken by a capturing device, the current image captured after a previous image is captured, the method comprising: determining one or more noticeable pixel groups; performing multiple comparisons between a pixel value of a noticeable pixel belonging to the noticeable pixel groups, and values of multiple pixels in the current image, each of the multiple pixels in the current image having an offset relative to the noticeable pixel, yielding multiple comparison results, each of the comparison results associated with the offset;

determining a minimum result between the multiple comparison results; and determining a correction of at least a portion of the current image as a function of the offset associated with the minimum result. Within the method, the noticeable pixel group optionally comprises one or more pixels located in the vicinity of at least two regions having significantly different pixel values. Within the method, the noticeable pixel group comprises at least two groups of pixels having no common corners. Within the method, the multiple comparison results are optionally stored in a matrix. The method can further comprise a step of correcting at least a portion of the current image as a function of the determined correction. The correction is optionally determined using a previous determined correction between a first previous image and a second previous image. Within the method, the correction is optionally performed for one or more pixels in the current image, having a location related to the noticeable pixel group. Within the method, each of two or more different corrections is applied to a different portion of the current image. The method can further comprise a step of applying an interpolation result of two or more corrections, to one or more pixels in the current image, the one or more pixels not belonging to pixels corresponding to the noticeable pixel group. Within the method, determining the multiple comparison results optionally takes into account a weight of a pixel, a number of appearances in previous images, influence of previous corrections, location, or a combination thereof. Within the method, the capturing device optionally comprises a CMOS sensor. Within the method, the offset determined for one or more pixels belonging to an upper region of the current image is associated with an offset determined for one or more pixels belonging to a lower region of the previous image, or the offset determined for one or more pixels belonging to a lower region of the current image is associated with an offset determined for one or more pixels belonging to an upper region of the previous image. The method can further comprise a step of storing the multiple comparison results in a matrix. The method can further comprise a step of applying a low-pass filter to the matrix. The method can further comprise a step of applying an IIR filter to the comparison results. The method optionally comprises switching the IIR filter between fast IIR filter and slow IIR filter. Within the method, determining the correction is done using a rule. The rule optionally relates to one or more items from the group consisting of: a sensor used in the capturing device; a size of an image captured by the capturing device; resolution of an image captured by the capturing device; luminance or brightness conditions of the capturing device; number or location of important objects seen in the previous image; background color of the previous image or the current image; and size ratio between one or more objects seen in the previous image or the current image. Within the method, the correction is optionally determined before the current image is fully captured.

Another aspect of the disclosure relates to a method of correcting a current image taken by a capturing device comprising a CMOS sensor, the current image captured after a previous image is captured, the method comprising: determining at least two pixel groups; for each pixel group, performing multiple comparisons between a pixel value of a pixel belonging to the pixel group, and values of multiple pixels in the current image, each of the multiple pixels in the current image having an offset relative to the pixel, and associating each comparison result with the offset; for each pixel group, determining a minimum result among the at least one comparison result; and for each pixel group determining a correction of at least a portion of the current image as a function of the offset associated with the minimum result. The method can further comprise a step of applying an interpolated correction to one or more pixels in the current group, the one or more pixels not corresponding to any of the pixel groups, the correction determined using two or more corrections, each of the two or more corrections associated with one pixel group. Within the method, the offset determined for one or more pixels belonging to an upper region of the current image is determined using an offset determined for one or more pixels belonging to a lower region of the previous image, or the offset determined for one or more pixels belonging to a lower region of the current image is determined using an offset determined for one or more pixels belonging to an upper region of the previous image.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

Figure 1A:
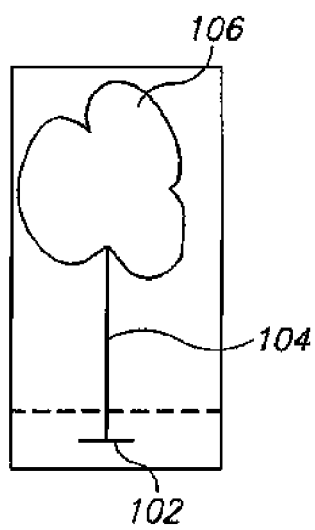
FIG. 1 is an illustration of a group of images requiring stabilization.

The subject matter discloses a method for stabilizing a current image or a portion of thereof, taken as part of a sequence of images by using information form one or more previous images, wherein the current and the previous images are captured as a sequence of images. Each image is represented by a collection of pixel value, wherein the pixel values represent the color or illumination conditions in the image, which may depend on the scene and on the capturing device. For example, a region in the image in which the pixels have value of 100 will appear darker than another region in which the pixels have value of 180. The method comprises a step of detecting data related to a few noticeable pixels in previously captured images and storing the data. The number of pixels is preferably small, for example between about 10 and about 100, rather than a region comprising a large number of pixels. In addition, the detected noticeable pixels do not have to be continuous, i.e. two or more pixels or pixel groups can be detected, which do not have a common side or a common corner. Such data preferably relates to edges, i.e. the data comprises pixels located between two or more regions having significantly different pixel values. The data related to the noticeable pixels may comprise pixel values and pixel locations of pixels located at the edge of any of those regions, or in the vicinity of one or more regions. One or more noticeable pixels or pixel groups are detected in various locations in the images, the noticeable pixels in each pixel group may be on one row or column, or may be located diagonally to each other. Then, the values of the noticeable pixels are searched for within one or more regions surrounding the expected location of the noticeable pixels in the current image. For example, the pixel values can be searched for within a region of the current image, which is at most N pixels in each direction from the location of the pixels in a previous image.

The noticeable pixels are preferably determined before capturing further images, such as the current image on which the methods for stabilization are performed.

After the noticeable pixels from a previous image are stored, the current image is captured. Then, the values of the noticeable pixels in the current image, after being offset in a predetermined horizontal offset and in a predetermined vertical offset are determined, for each offset combination within predetermined limits. Then, the difference between the values of the noticeable pixels as shifted from the previous image to the values in the current image, is estimated for each offset combination. A correlation matrix is then generated for each offset combination. The horizontal axis of the correlation matrix, refers to the horizontal offset, and the vertical axis, refers to the vertical offset, or vice versa. Thus, the (i, j) entry of the correlation matrix represents the similarity between the pixel values in the current image and the values of the same pixels in the previous image when shifted in the i-th value of the horizontal offset and the j-th value of the vertical offset. Sometimes, horizontally and vertically oriented noticeable pixels are handled separately in order to better discriminate offsets in different directions. In this case two separate correlation matrices are estimated; one for horizontal and one for vertical direction. Each of these matrices is then scanned for the minimal values determining the image offsets in horizontal and vertical directions. The regions in which the noticeable pixels are searched for, may be in the shape of a polygon such as a rectangle, a generally elliptical shape or any other shape. The determined horizontal and vertical offsets are those for which the difference is minimal. Unlike prior art solutions that compare the entire images, the subject matter suggests searching for only a few pixels of the previously captured images within regions in the current image, thus reducing memory consumption and enabling real time image stabilization. Further, the method and apparatus enable simultaneous comparison of several pixel groups for reducing the required time, and for differentiating between objects moving in different directions or speed.

Since the image is captured row-by-row or column-by-column, once the movement of two or more pixel groups between two images is determined, the relative part of the movement can be applied to rows in between the pixel groups by interpolating the movement, thus generating a linear or close to linear stretching or shrinking.

It will be appreciated by a person skilled in the art, that since CMOS sensors capture images row-by-row or column-by-column, then the time gap between the last rows of image N and the first rows of image N+1 is small. Thus, the offset determined for the last rows of image N can be used as a starting point for the determining the offset of image N+1, and enables limiting the region in which noticeable pixels are searched for.

In a preferred embodiment, actions such as activating a low-pass filter or averaging the matrix or parts thereof may be performed on the correlation matrix. Such filters can filter out the non-voluntary movements created for example by a trembling hand of the person taking the images or by objects within the image, and leave only the voluntary movements of the camera and of the objects.

Figure 2:
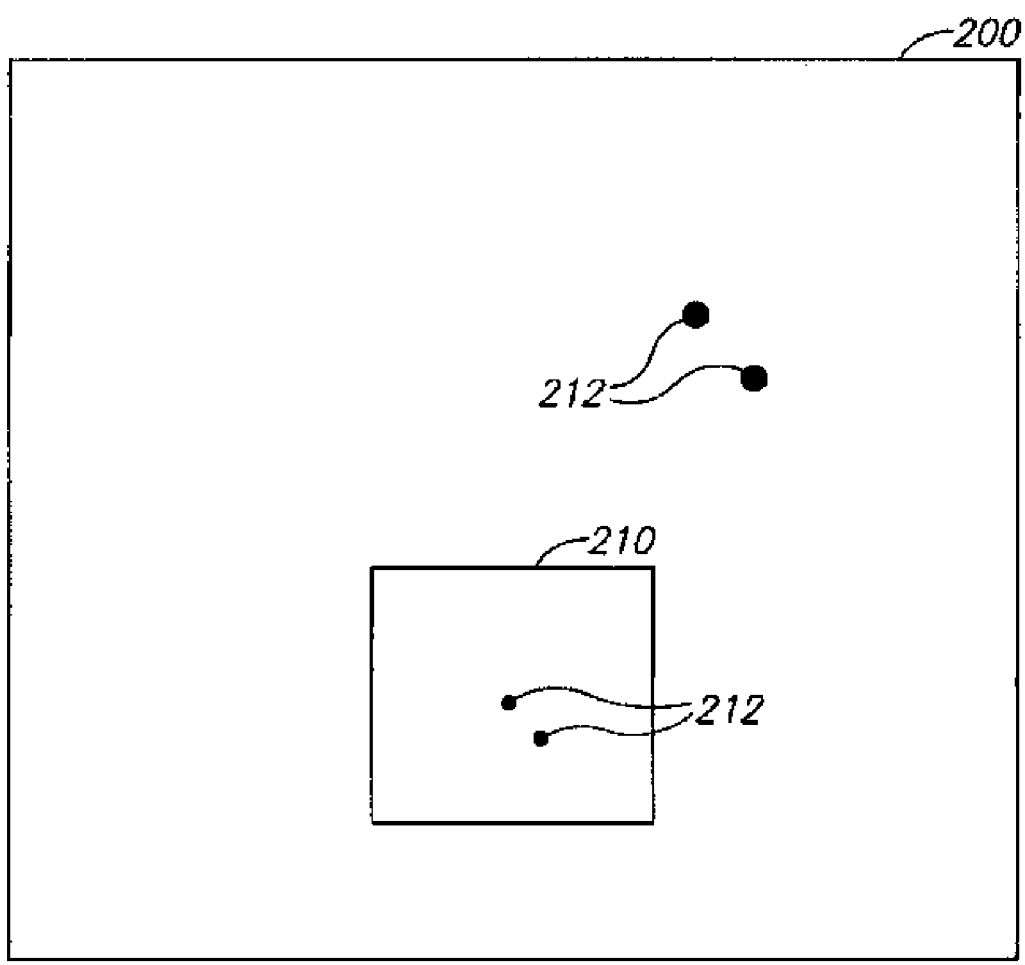
FIG. 2 shows an image to be stabilized by comparing noticeable pixels to from previously captured image, in accordance with an exemplary embodiment of the disclosed to subject matter.

Referring now to FIG. 2, illustrating captured image 200 and the elements required for correcting the image according to the current disclosure. Image 200 is stabilized using noticeable pixels from previously detected images. Two pixels 212 from previously captured images are searched for within region 210. Region 210 is preferably determined by an estimated offset as available from offset determination performed for previous images. If no prior information is available, region 210 is determined as a region surrounding pixels 222. For example, the size of the image is 200 pixels height and 150 pixels width (200×150), and the location of the important pixels 212 is row 88 and columns 101 and 102 (also referred to as (88, 101) and (88, 102)). In case the size of region 210 is 8 pixels length by 10 pixels width, region 210 resides in rows 85-92 and columns 97-106. The difference between the pixel values of the noticeable pixels in the previously captured image, and the values within the current image of pixels shifted in predetermined horizontal and vertical offset relatively to the location on the previous image are stored for each horizontal and vertical offset combination. The offsets associated with the entry in the correlation matrix having the lowest value is the offset of the pixels between the previous image and the current image.

One or more pixels located between two regions having significantly different pixel values, or located on the edge of a region are significant in analyzing an image. For example, such pixel or a group of pixels may represent a corner of an object, edge lines, maximal gradient and other changes in the image.

In preferred embodiments of the disclosure, each noticeable pixel or group of pixels associated with each region is handled with a separate correlation matrix, for correcting the region separately. In other embodiments, a common correlation matrix is determined for all or some of the pixels or pixel groups according to several correlation matrices and the correction is homogeneous over the entire image. If the correlation matrix relates to more than one noticeable pixel, the value in an entry of the correlation matrix may be the sum of the absolute values of the distances between the values of the relevant pixels in the two images, the square root of the sum of the square distances, or the like. It will be appreciated that a pixel or pixel group can also be searched for within multiple areas, for example if the movement direction is unknown.

The size of region 210 is determined as a function of several parameters, such as the size or the number of pixels within the image, the level of accuracy required, previous corrections, computational limitations, other system considerations, and the like.

Comparing only the noticeable pixels to regions in the captured image results in significantly reducing the processing power and memory required for calculations, in comparison to prior art solutions. Further, the amount of data required from previous images is significantly reduced.

If correlation matrices are generated for multiple parts of the image, then the offset determined for one part can be useful in determining the offset of another part. For example, if the minimal value of the correlation matrix of one part is obtained at offset (10, 10), while for another part, the correlation matrix has two local minima, at (−30, −30) and at (8, 8), then the offset of (8, 8) will probably be preferred.

Figure 3:
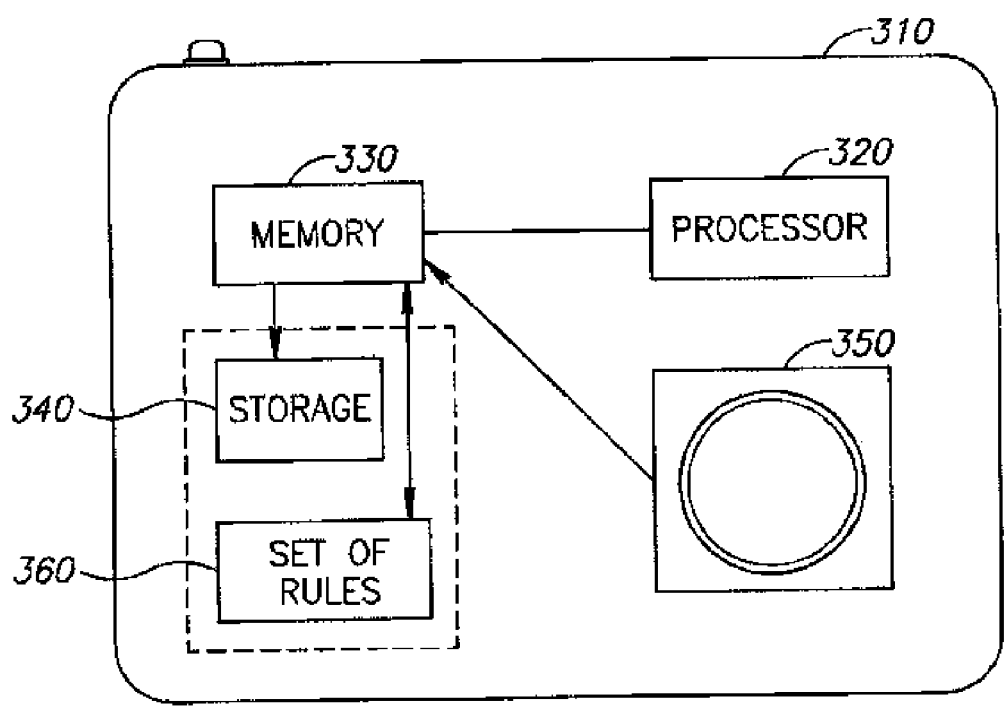
FIG. 3 is an schematic block diagram of a camera and the elements thereof for implementing the methods disclosed in the subject matter.

Referring now to FIG. 3, showing an illustration of a camera and the elements thereof for implementing the methods disclosed in the subject matter. Camera 300 captures images via image capturing device 350, which may use a CCD sensor, a CMOS sensor, or the like. The camera captures sequences comprising one or more images, wherein at least some of the images require stabilization. The camera and elements comprise capturing element 350, processor 320, memory 330, storage 340, and set of rules 360. Images from image capturing device 350 are transmitted to memory 330, where they are stored and corrected. After correcting the image in memory 330, the image is stored on storage 340 or another permanent storage device, or sent to a viewing device (not shown) or to any other destination. As disclosed above, the correction of the image is preferably performed in memory 330, for reducing resource consumption and time required for correcting the handled image. The correction is further detailed in association with FIG. 4 below.

Memory 330 may also store noticeable pixels from previous images, as well as previous corrections. Such noticeable pixels may also be stored in storage 340. The correction is performed by processor 320 according to any one or more of rules 360. Processor 320 is preferably a computing platform such as a general purpose processor or a dedicated processor.

Once the handled image is stored in memory 330, memory 330 transmits at least one query to processor 320, which determines according to set of rules 360 the steps for correcting the image. For example, an image captured by a CMOS sensor requires different steps than an image captured by a CCD sensor. Other parameters related to determining the steps for correcting the image may relate to the size, resolution, luminance or brightness conditions, number and location of important objects, background color, size ratio between one or more important objects and the like. Set of rules 360 may be stored on storage 340, or connect to memory 330 from an independent storage, and accessed by processor 320. The set of rules is preferably configurable, and rules may preferably be changed, deleted, or added by a user.

Once the steps for correcting the handled image are determined processor 320 performs the relevant mathematical or logical operations on the image required for motion compensation. In this case, processor 320 accesses data related to noticeable pixels from both the current image and previously captured images. Such data is stored in memory 330 or on storage 340. Storage 340 may be a Random Access Memory (RAM), hard disk, magnetic media, memory card, flash memory, or the like. The data related to the important pixels preferably comprises pixel value, location, previous corrections, or the like. Relative or absolute weight or importance of pixels may be defined by set of rules 360, preferably according to the number of appearances of an object in previous images, the influence of an object in previous corrections and the like. Processor 320 generates correlation matrix for determining the difference between pixel values of the noticeable pixels in previously captured images, and regions related to the shifted noticeable pixels in the current image. In an exemplary embodiment, processor 320 generates a horizontal correlation matrix for determining camera movement in the horizontal axis and a vertical correlation matrix for determining the camera movement in the vertical axis. In some embodiments of the subject matter, processor 320 modifies values in the correlation matrix or matrices by taking into account the weight or importance of pixels and corrections in previous images or in other regions.

Once the correlation matrices are determined, processor 320 determines the minimal value of each matrix, and corrects at least a portion of the current image accordingly. Alternatively, processor 320 transmits the required correction to another processing unit, which corrects the image or part thereof. The correction is further detailed in association with FIG. 4 below. Processor 320 may also perform additional actions such as low-pass filtering on the handled image for smoothing the handled image, and applying IIR filter as described below, for distinguishing between camera motion and hand shaking. Once an image is corrected, the image is stored in storage 340. The corrections and data related to the important pixels are preferably stored in memory 330 to facilitate correction of the next captured image.

Figure 4:
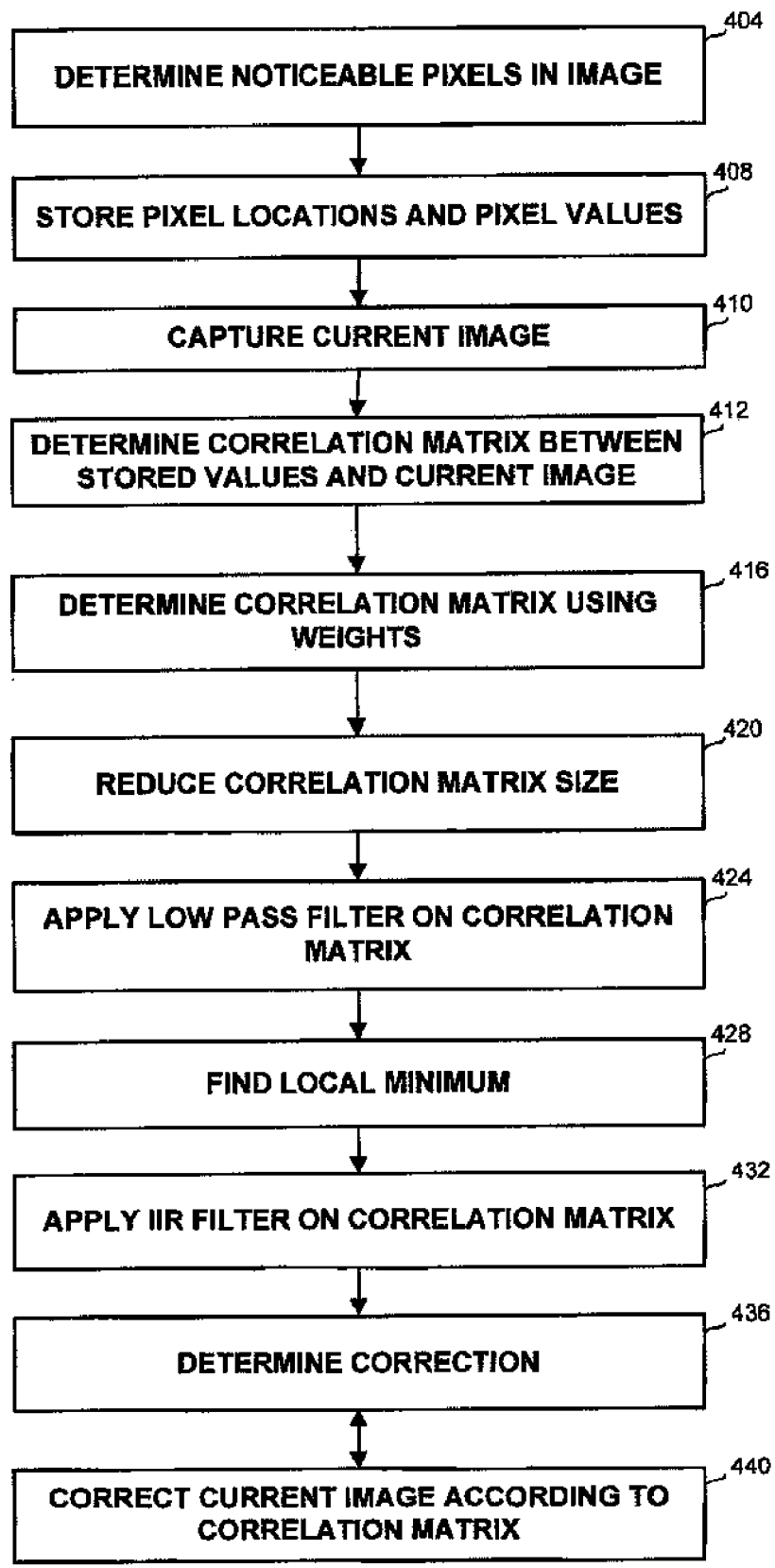
FIG. 4 showing a schematic flowchart of a method for stabilizing an image, in accordance with an exemplary embodiment of the disclosure

Referring now to FIG. 4, showing a schematic flowchart of a method for stabilizing images captured using a CCD sensor or a CMOS sensor. On step 404, data related to noticeable pixels from a previous images is detected. Such data preferably includes pixel values and pixel locations in previous images. The pixels are determined for example using edge detection techniques, selecting pixels having values substantially different relatively to their environment, or the like. The noticeable pixels are preferably located at or near an edge of a region having the same pixel values, or in another distinct location on the image. Hence, the importance of such pixels in finding the best value in a correlation matrix is higher than when comparing an entire previously captured image to the current image. In a preferred embodiment of the disclosure, the noticeable pixels are searched separately for horizontal edges which indicate vertical movement, and for vertical edges which indicate horizontal movement. On step 408, the pixels and related data are stored in a memory device. On step 410, the camera captures the current image which may have to be corrected. On step 412, one or more correlation matrices are generated, according to the differences between the stored pixel values, and pixel values in offset locations in the current image. Step 412 also comprises a sub-step of determining the regions, i.e. the size and locations of the areas in which the noticeable pixels are to be searched for within the current image. One or more regions are determined for one or more noticeable pixels or to one or more noticeable pixel groups. The correlation matrices are determining by comparing pixel values of the noticeable pixels in the previous image with the relevant locations in the current image. If no prior knowledge about the required correction is available, then each correlation matrix is preferably centered at the location of one of the noticeable pixels in the previously captured image, and the values of the noticeable pixels are compared to pixels in both right and left directions in the horizontal axis, and to the upper and lower direction in the vertical axis. In a preferred embodiment, two correlation matrices are generated; a vertical correlation matrix and a horizontal correlation matrix, each for determining movement on the respective axis. If the noticeable pixels are determined separately for vertical edges and horizontal edges, then two correlation matrices can be used, a first correlation matrix indicating horizontal offset and a second correlation matrix indicating vertical offsets. In one embodiment, the differences may be stored in a data structure other than a matrix, as long as the value of each difference is associated with the relevant one or more offset values. On optional step 416, the correlation matrices are refined by taking into account the weight of data related to the important pixels captured in the handled image. Each object or data field related to an object, such as size, edge lines, and the like, may be assigned a weight, the weight preferably being a function of previous behavior of the object. For example, the weight is a function of the number or percentage of appearances of the noticeable pixels in previous images. The weight is also used to balance a value in the correlation matrix, in case the distance between the minimal value in the matrix and the previous registration is larger than a predetermined threshold. In some cases, the difference between a minimal value of a matrix and another value in the same matrix is lower than a predetermined threshold, which makes finding the correct minimal value in the matrix more difficult. Thus, corrections determined by other matrices of the current image may be taken into consideration and some values in a matrix will be modified. On optional step 420, the size of the correlation matrices is reduced by averaging neighboring rows into one row, averaging neighboring columns into one column, or averaging areas into a single value. Size reduction of the correlation matrices enables faster calculations, for example when determining local minima. On step 424, low pass filter is optionally applied to the correlation matrix in order to smooth the correlation matrix and remove noise from the matrix. On step 428, the minimal values in the correlation matrix or matrices, or another data structure are determined, for example by processor 320 of FIG. 3. The minimal values indicate the relevant offset between the images movement of the camera. When two matrices are used, one for horizontal offsets and one for vertical offsets, then each minimal value defines the movement on each axis. When multiple matrices are used for multiple pixels or pixel groups, then each matrix defines the movement for the respective pixel or pixel group. On step 432, a non-linear resetable Infinite Impulse Response (IIR) based filter is used to distinguish between camera movement and local movements, such as hand shaking or temporary movements caused by wind. The filter is based on two filters: a fast IIR filter with small phase delay and insufficient smoothing on input data, and a slow IIR filter that performs sufficient low pass filtering but has a significant phase delay. The slow IIR filter is switched, i.e., reset to fast IIR filter when the phase delay is higher than a predefined value, to achieve sufficient phase delay and smoothing. On step 436, the correction is determined from the correlation matrix or from the other data structure used for associating a value difference with one or more offsets. The correction is preferably determined by applying mathematical or logical functions to the correlation matrix or the other data structure. The correction can also take into account previous correction results determined by analyzing multiple previous images. For example, a linear movement can be continued in further images. On step 440 the current image is corrected according to the determined correction, or according to further mathematical or logical operations applied at the determined correction. It will be appreciated that the corrected pixels are not necessarily those having the same location as the noticeable pixels in the previous image, but rather the pixels that correspond to the noticeable pixels as a result of the movement or the expected movement. In a preferred embodiment, the actual correction may consist of reading, i.e., accessing the image starting from the pixel determined by the opposite value of the offset discovered by the registration mechanism described above. For example, if it is determined that the image was offset by four pixels to the right, then reading the image will start at the fifth pixel from the left, thus shifting all or some of the image's contents back to their previous location. This correction is limited to the resolution of a single pixel. However, it is possible to determine the offsets by proper analysis of the correlation matrices with sub-pixel resolution. The image might be therefore corrected using a sub-pixel offset by sub-pixel interpolation mechanism. The sub-pixel interpolation mechanism is sometimes available in the camera and used for zooming purposes. Therefore, the sub-pixel interpolation mechanism can be also used for interpolated movement purposes as well.

Correcting the image is relevant to parts of the image rather than to single or a few pixels, wherein different parts of the image may move in different ways. Since when using CMOS sensors, each area, such as row, is captured at a different time, multiple movements and distortions may occur for different areas of the image. For example, if a rectangle is captured, each corner moves in a different way resulting in the rectangle appearing like a parallelogram. Thus, correcting the image by using a shift operation according to the determined offsets, and interpolating the image can correct other types of changes and distortions, including moving, shearing, stretching, shrinking, or others. Various types of movements can be distinguished. For example, large or significant shifts are usually the result of a voluntary movement, such as a person intentionally moving the camera. However, small movements may be the result of a shaking hand and may thus be undesired. Some motion types may be distinguished, for example by applying the low pass filter as detailed above. Then only the required types of motions can be corrected, for example by correcting only the small movements in order to stabilize the image and not the large movements, to show the desired images. It will be appreciated by a person skilled in the art that step 436 can be performed, i.e. the correction can be determined for the whole image, after which step 440 is performed, Alternatively, steps 436 and 440 can be performed in parallel wherein while one area of the image is corrected, the correction is determined for another area of image. It will be further appreciated that correcting an image can start before the full image was captured. Thus, the correction for a captured part of the image can be determined and possibly applied while another part is still being captured.

The steps above, excluding the capturing of the images, are preferably performed by executing computerized applications comprising computer instructions. The applications, implemented as one or more executables, libraries, routines or other components may be written in any programming language such as C, C#, C++, Java, VB, VB.Net, or the like, and developed under any development environment, such as Visual Studio.Net, J2EE or the like. It will be appreciated that the applications or parts thereof can alternatively be implemented as firmware ported for a specific processor such as digital signal processor (DSP) or microcontrollers, or can be implemented as hardware or configurable hardware such as field programmable gate array (FPGA) or application specific integrated circuit (ASIC). The methods can also be adapted to be executed on a computing platform, or any other type of computing platform that is provisioned with a memory device (not shown), a CPU or microprocessor device, and several I/O ports (not shown) as noted above.

When correcting an image, the pixels are preferably moved in the opposite direction, so as to compensate for the movement. When using CMOS sensors, lines are captured one after the other. Thus, each line is corrected according to its location relatively to one or more noticeable pixels. For example, if a noticeable pixel located at the top of the image has not moved at all, while a noticeable pixel located at the bottom of the image has moved by ten pixels, then pixels located at the middle line will be corrected by five pixels.

When two types of motions are present, for example larger voluntary movements, and smaller involuntary movements, then for stabilizing the pictures only the involuntary movement is corrected, as detailed in association with step 436 above.

Figure 1B:
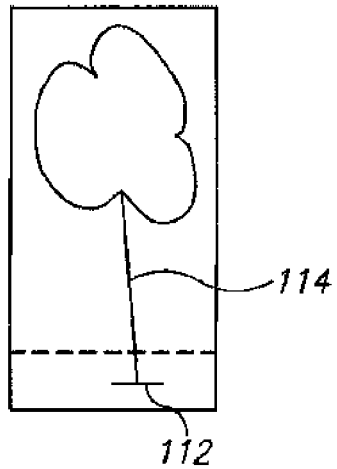
Figure 1C:
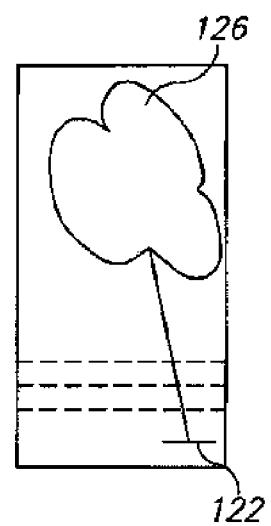

The shear effect, as demonstrated in FIG. 1, as well as stretching and compressing of elements, both caused by voluntary movements are preferably corrected for the whole motion, comprising both the voluntary and non-voluntary movements.

Figure 5:
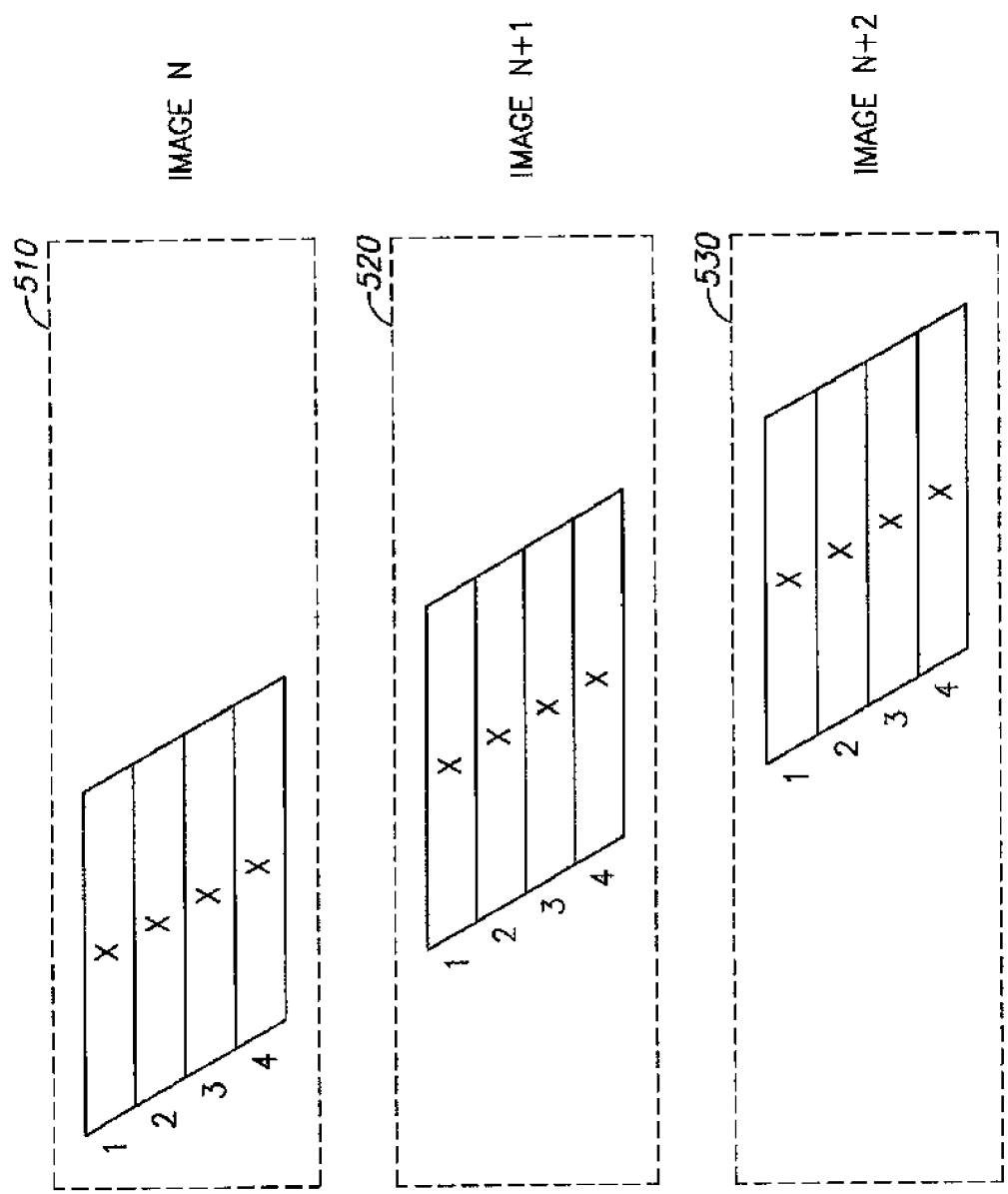
FIG. 5 is an illustrating of a sequence of images captured in CMOS sensor handled to correct motion compensation in real time, in accordance with an exemplary embodiment of the disclosure.

Referring now to FIG. 5, illustrating a sequence of images captured by a CMOS sensor, image N (510), image N+1 (520) and image N+2 (530). Each of images 510, 520 and 530 is divided into four segments, marked 1, 2, 3 and 4. For each image in FIG. 5, segment 1 is captured before segment 2, segment 2 is captured before segment 3 and segment 3 is captured before segment 4. The sequence of images may be handled as a continuous frame due to the unique characteristics of CMOS, in which different portions of the image, in this case different lines, are captured in different time segments.

Within each image, the location of "X" symbol, located in the middle of each segment, shifts from one segment to another towards the right portion of the image, due to camera movement. The difference in the location of the symbol is visible also between segments, and not only between images. Hence, motion compensation is also required between one segment to another. In other words, the required correction may be different within the same image. In order to improve registration in segments, correction is based on the movements of objects from previous images and corrections determined for previous segments.

The correction of a segment of an image captured using a CMOS sensor is based on the camera movement related to the segment. For example, when determining the movement of segment 1 of image N+2 (530), the movements determined between segments 1 to 4 of image N (510) and segments 1 to 4 of image N+1 (510) are taken into consideration. In an exemplary embodiment, the movement of segment 1 of image N+1 (520) is the average of correction values of segments 1 to 4 of image N (510) or a function thereof. The movement of a segment may be corrected by movements of segments from two images. For example, correcting segment 3 of image N+1 (520) according to segments 1 and 2 of image N+1 (520) and segments 3 and 4 of image N (510). Alternatively, a segment may overlap between two images and contain lines from two images. For example, one segment may contain the last line of image N (510) and the first line of image N+1 (520). The disclosed method reduces the computational resources required for correcting images since handling a segment requires less memory and calculations and each segment may be corrected in real time. A segment in the current image may be compared to the entire previous image in case the noticeable pixels to which it is compared do not appear in the same segment in the previous image due to camera movement. For example, a noticeable pixel that appears in segment 2 of images N (510) and N+1 (520) may not appear in segment 2 of image N+2 (530) due to camera movement. As a result, the computerized entity that performs motion compensation takes into account corrections made to segment 1 of image N+2 (530) in order to detect the missing object in another segment, probably segment 1 or segment 3.

Since in CMOS sensors, the time difference between capturing the last segment of image N and the capturing of the first segment of image N+1 may be small and similar or equal to the time difference between capturing consecutive segments of a certain image, this time proximity between segments of different images enables the correction of the first one or more segments belonging to the next image using the correction applied to the last one or more segments belonging to the previous image.

Thus, the disclosed method enables row wise correction for images captured by CMOS sensors, which accounts for smoother motion.

For example, correcting the location of an object in the image may be performed by replacing pixel values of the correct location with the pixel values of the object and replacing the pixel values of the incorrect location of the object with pixel values representing the background of the image.

One technical effect of the disclosed subject matter enables the provision of fast motion compensation, by comparing less data than prior art methods. This is achieved by comparing data related to noticeable pixels instead of comparing the entire image or significant parts thereof as performed in prior art motion compensation. By comparing only data relevant to motion compensation, the accuracy of the corrected image is generally improved, and the correction is achieved in real time.

Another technical effect of the disclosed subject matter relates to reducing the amount of memory required for motion compensation. While the disk or memory card for cameras is relatively cheap, the internal memory used for mathematical or logical calculations and operations on the captured image before sent to the disk is expensive. Storing only a small amount of data related to previous images or previous corrections, for determining the movement of the current image provide more efficient memory use and thus saves memory space relatively to prior art methods. Comparing less data from previously captured images requires storing less data. Alternatively, the memory may be used for performing multiple operations on the handled image, thus improving the results. For example, generating correlation matrices on data related to two or more parts of the image and interpolating the minima so as to provide smoother correction of the image.

Another technical effect is to provide motion compensation in a resolution of segments, instead of a resolution of images. Segment resolution is preferably performed on images detected in CMOS sensors. Handling a segment requires less memory than handling an entire image, especially using the method of comparing only data related to objects in the image. In the disclosed method, correction of previous segments in the same image or in another image is used to correct the handled segment. Hence, a continuous change of the camera movement is detected and the correction is more accurate. Segment correction may also use data related to the same segment in previous images to determine whether the objects from previous images are displayed in the correct segment and prevent the case in which an object is shown in another segment because of camera movement. In addition, separately correcting segments enables separate storage of the segments on the disk.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for correcting a current image taken by a capturing device, the current image being captured after a previous image is captured, the method comprising:
    determining at least one noticeable pixel group;
    performing multiple comparisons between a pixel value of at least one noticeable pixel belonging to the at least one noticeable pixel group, and values of multiple pixels in the current image, each of the multiple pixels in the current image having an offset relative to the at least one noticeable pixel, yielding multiple comparison results, each comparison result being associated with the offset;
    determining a minimum result between the multiple comparison results;
    determining a correction of at least a portion of the current image as a function of the offset associated with the minimum result; and
    applying an interpolation result of at least two corrections, to at least one pixel in the current image, the at least one pixel not belonging to pixels corresponding to the at least one noticeable pixel group.

2. The method of claim 1 wherein the noticeable pixel group comprises at least one pixel located in the vicinity of at least two regions having significantly different pixel values.

3. The method of claim 1 wherein the noticeable pixel group comprises at least two groups of pixels having no common corners.

4. The method of claim 1 wherein the multiple comparison results are stored in a matrix.

5. The method of claim 1 further comprising a step of correcting at least one portion of the current image using a result of applying a function to the determined correction.

6. The method of claim 1 wherein the correction is determined using a previous determined correction between at least one first previous image and at least one second previous image.

7. The method of claim 1 wherein the correction is performed for at least one pixel in the current image, having a location related to the at least one noticeable pixel group.

8. The method of claim 1 wherein each of at least two different corrections is applied to a different portion of the current image.

9. The method of claim 1 wherein determining the multiple comparison results takes into account one or more of the following: a weight of a pixel, a number of appearances in previous images, an influence of previous corrections, and a location.

10. The method of claim 1 wherein the capturing device comprises a CMOS sensor.

11. The method of claim 10 wherein the offset determined for at least one pixel belonging to an upper region of the current image is associated with an offset determined for at least one pixel belonging to a lower region of the previous image.

12. The method of claim 10 wherein the offset determined for at least one pixel belonging to a lower region of the current image is associated with an offset determined for at least one pixel belonging to an upper region of the previous image.

13. The method of claim 1 further comprising a step of storing the multiple comparison results in a matrix.

14. The method of claim 1 wherein determining the correction is done using at least one rule.

15. The method of claim 14 wherein the at least one rule relates to one or more of the following: a sensor used in the capturing device; a size of an image captured by the capturing device; resolution of an image captured by the capturing device; luminance or brightness conditions of the capturing device; number or location of important objects seen in the previous image; background color of the previous image or the current image; and size ratio between one or more objects seen in the previous image or the current image.

16. The method of claim 1 wherein the correction is determined before the current image is fully captured.

17. A method for correcting a current image taken by a capturing device, the current image being captured after a previous image is captured, the method comprising:
    determining at least one noticeable pixel group;
    performing multiple comparisons between a pixel value of at least one noticeable pixel belonging to the at least one noticeable pixel group, and values of multiple pixels in the current image, each of the multiple pixels in the current image having an offset relative to the at least one noticeable pixel, yielding multiple comparison results, each comparison result being associated with the offset;
    determining a minimum result between the multiple comparison results;
    determining a correction of at least a portion of the current image as a function of the offset associated with the minimum result;
    storing the multiple comparison results in a matrix; and
    applying a low-pass filter to the matrix.

18. The method of claim 17 further comprising a step of applying an impulse response filter to the comparison results.

19. A method for correcting a current image taken by a capturing device, the current image being captured after a previous image is captured, the method comprising:
    determining at least one noticeable pixel group;
    performing multiple comparisons between a pixel value of at least one noticeable pixel belonging to the at least one noticeable pixel group, and values of multiple pixels in the current image, each of the multiple pixels in the current image having an offset relative to the at least one noticeable pixel, yielding multiple comparison results, each comparison result being associated with the offset;
    determining a minimum result between the multiple comparison results;
    determining a correction of at least a portion of the current image as a function of the offset associated with the minimum result; and
    applying an impulse response filter to the comparison results.

20. The method of claim 19 further comprising switching the impulse response filter between a fast impulse response filter and a slow impulse response filter.

21. The method of claim 19 further comprising a step of storing the multiple comparison results in a matrix.

22. A method for correcting a current image taken by a capturing device comprising a CMOS sensor, the current image being captured after a previous image is captured, the method comprising:
    determining at least two pixel groups;
    for each pixel group, performing multiple comparisons between a pixel value of at least one pixel belonging to the pixel group, and values of multiple pixels in the current image, each of the multiple pixels in the current image having an offset relative to the at least one pixel, and associating each comparison result with the offset;
    for each pixel group, determining a minimum result among the comparison results;
    for each pixel group determining a correction of at least a portion of the current image as a function of the offset associated with the minimum result; and
    applying an interpolated correction to at least one pixel in the current group, the at least one pixel not corresponding to any of the pixel groups, the correction being determined using at least two corrections, each of the at least two corrections being associated with one pixel group.

23. The method of claim 22 wherein the offset determined for at least one pixel belonging to an upper region of the current image is determined using an offset determined for at least one pixel belonging to a lower region of the previous image.

24. The method of claim 22 wherein the offset determined for at least one pixel belonging to a lower region of the current image is determined using an offset determined for at least one pixel belonging to an upper region of the previous image.

* * * * *